June 23, 1964 M. EATON 3,138,696

ELECTRODE HOT WATER GENERATORS

Filed March 12, 1962 5 Sheets-Sheet 1

Inventor
M. EATON
Heatley & Morrison
Agent

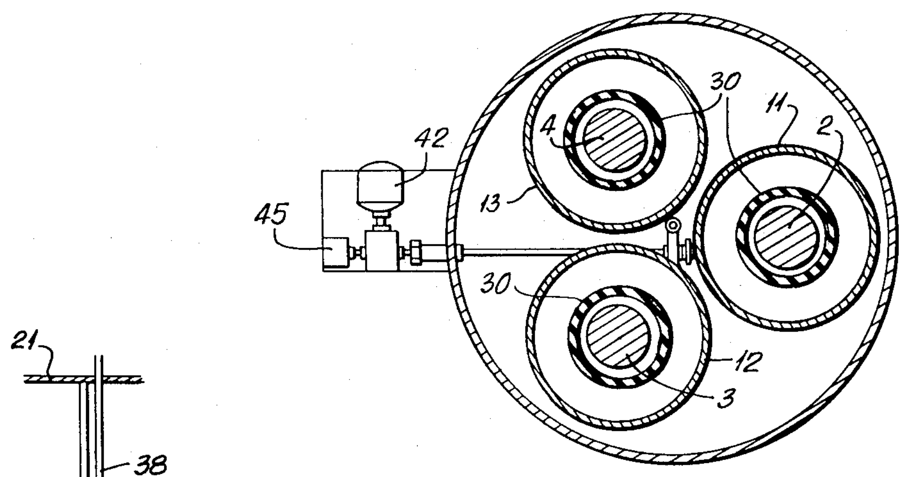
Fig. 3
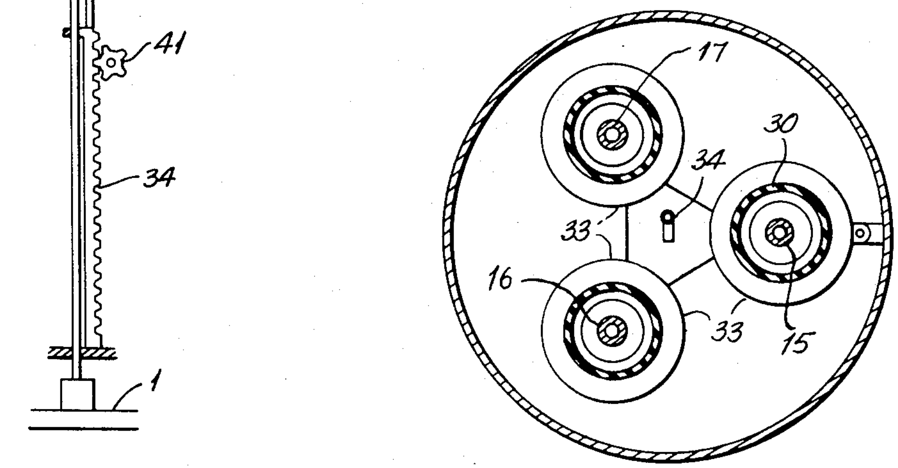
Fig. 2
Fig. 4
Inventor
M. EATON
Heatley & Morrison
Agent Inventor
M. EATON Heatley & Morrison
Agent

ELECTRODE HOT WATER GENERATORS

Filed March 12, 1962 5 Sheets-Sheet 4

Inventor
M. EATON

Heatley & Morrison

Agent

ELECTRODE HOT WATER GENERATORS

Filed March 12, 1962 5 Sheets-Sheet 5

Inventor
M. EATON
Heatly & Morrison
Agent

United States Patent Office 3,138,696
Patented June 23, 1964

3,138,696

ELECTRODE HOT WATER GENERATORS

Milton Eaton, 363 9th St., Shawinigan, Quebec, Canada

Filed Mar. 12, 1962, Ser. No. 179,173
10 Claims. (Cl. 219—286)

This invention relates to improvements in electric hot water generators of the electrode type, herein referred to as electrode hot water generators or simply as generators. More particularly, the invention relates to electrode hot water generators suitable for operation at high voltages.

It is the principal object of the invention to provide an electrode hot water generator of economical design that can be operated at any distribution voltage between 2 kilovolts and 15 kilovolts. A further object of this invention is to improve the performance of electrode hot water generators. Other objects will become apparent from the description to follow. With these and other objects in view, the present invention is featured by novel construction which enables the essential functions to be performed automatically and by means of a minimum amount of apparatus. The objects of this invention are attained by the use of novel features providing the most advantageous flow of water through the generator, means for obtaining the most satisfactory characteristics of the electric circuit through the water, and the most suitable means for automatically regulating the generator load.

An electric hot water generator of the type encompassed by the present invention possesses at least one electrode, having an extension to its lower end made of insulating material, suspended vertically from the upper portion or top of the generator, and has a water inlet pipe or spout directly below the electrode pointing upwards towards and terminating at substantially the same level as the electrode tip, so that water is discharged upwards towards the electrode tip with sufficient velocity to flow upwards over the length of the electrode. The generator also has an electrically conductive cylinder surrounding each electrode, said cylinder serving as a neutral electrode, preferably supported in the generator in such a manner that substantially all water which enters the generator through the water inlet pipes or spouts must descend within the walls of the neutral cylindrical electrodes before leaving the generator. An essential feature of the electrode hot-water generator of this invention is a non-conductive control tube or cylinder concentric with each electrode and which can be moved upwards to surround or shield a portion or all of the electrode, or downwards to expose a portion or all of said electrode, so that the position of said control tube regulates the amount of electricity flowing between the electrode and its surrounding neutral electrode.

An electrode hot water generator of the class described in the present invention preferably is operated in a closed system, the pressure of said closed system being maintained at a value such that the saturation temperature is considerably above the controlled temperature of the water leaving the generator. An expansion tank partially filled with steam (generated by separate means) or an inert gas such as nitrogen and maintained at the desired mean system pressure is a desirable part of the system. At least one pump is required for circulating the water which is the medium of heat transfer. The water employed in the heating system generally must be conditioned with respect to purity and conductivity; the water also must be de-aerated and free from all impurities that would cause insulators immersed in it to become contaminated with conductive material such as iron oxide.

The invention therefore comprises an electric hot water generator of the type having at least one electrode and adapted for operation in a closed heating system filled with water which is circulated through the system as a medium of heat transfer, said generator comprising in combination:

(*a*) At least one electrode, having an extension to its lower end made of insulating material, suspended vertically from the upper portion of the generator, (*b*) A waterspout directly below each electrode and pointing upwards towards and terminating at substantially the same level as the electrode tip, (*c*) Pumping means for circulating water through the heating system and discharging it through the said waterspouts at a substantially constant rate with sufficient velocity to pass over the surfaces of the electrodes, (*d*) Means for dividing the circulating water equally among the said waterspouts, (*e*) A water outlet located at a level below the electrodes of the generator, (*f*) A metal cylinder surrounding each electrode to form a neutral electrode, said cylinders being inter-connected and held in place in the vicinity of their tops by means of a diaphragm plate made to provide free water communication between the top and bottom portions of the generator only through the said cylinders, (*g*) A control tube of insulating material for each electrode, said control tubes being concentric with their associated electrodes and spaced between the associated electrode and the surrounding neutral electrode, and (*h*) Means for moving the said control tubes vertically.

The electrode hot water generator of this invention also contains means for passing the relatively cool incoming water through the conducting bodies of warmer water in both end zones of the electrodes at all loads, and for light loads, when the control tubes are at or near their upper limit of travel, advantageously contains means for restricting the cross-sectional areas of said bodies of water over substantial portions of their lengths to increase the electrical resistance of the circuit and thereby to reduce the minimum load. The generator of this invention also comprises means for regulating the generator load.

The invention will be understood from the following detailed description of preferred embodiments of it, reference being made to the accompanying drawings in which:

FIGURE 2 shows one section in greater detail.

FIGURE 3 is a plan view on the line A—A of FIGURE 1.

FIGURE 4 is a plan view on the line B—B of FIGURE 1.

Figure 1:
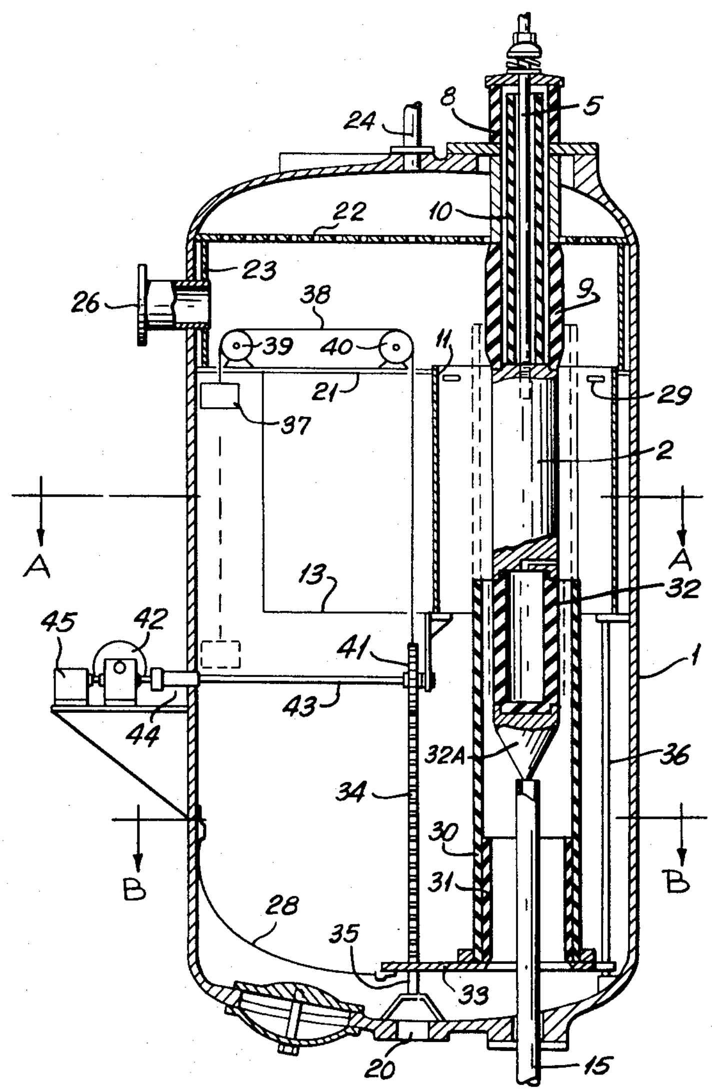
FIGURE 1 is a sectional view of a 3-phase, 3-electrode hot water generator of this invention.

Referring more particularly to FIGURES 1 and 3, a 3-phase, 3-electrode hot water generator of this invention is illustrated by pressure vessel 1 in which electrodes 2, 3, and 4 are suspended vertically from the top of the generator by means of current carrying parts 5, 6, and 7 (6 and 7 not shown) insulated from the pressure vessel by suitable bushings 8, 9, and 10 (one of each per electrode), said electrodes being immersed in water which completely fills the pressure vessel 1. Each electrode, preferably of cylindrical shape and made of cast iron or steel, is provided with an extension 32 made of electrically insulating material, such as porcelain or heat-resistant glass, and optionally having a conical metal tip 32A.

Heat is generated by the electric current passing through the water between the electrodes 2, 3, and 4 or between the electrodes and the metal cylinders 11, 12, and 13 concentric with their associated electrodes and forming grounded electrodes at the neutral point of the electric circuit. Parts 11, 12, and 13, referred to as the "neutral electrodes" or simply as the "neutrals," are preferably longer than the electrodes, and open into a diaphragm plate 21, which supports the neutrals at an elevation such that their tops are substantially at the same level as the tops of the electrodes. The plate 21 provides free water passages between the top and bottom zones of the generator only through the spaces between the electrodes and their associated neutrals.

Water inlet pipes or waterspouts 15, 16, and 17 (16 and 17 shown in FIGURE 4), preferably of steel or iron, enter from the bottom of the generator and terminate just below the tips 32A of their associated electrodes. U.S. Patent 2,986,623, issued May 30, 1961, describes means for preventing water oscillation when water is spouted up over the surface of an electrode. It has been found experimentally that the tendency to oscillation is directly proportional to the distance between the tip of an electrode and the top of its associated waterspout. In the present invention oscillation is prevented by terminating the waterspouts at substantially the same level as the tips of the electrodes, which arrangement is made practicable by the use of the electrode extensions 32 made of insulating material. The metal cone-shaped cap or electrode tip 32A at the bottom of each electrode extension 32 is provided to resist erosion of said extension or insulator 32 by abrasive particles in the spouted water. If insulator 32 is made of quartz, the metal tip 32A may be unnecessary. In order that the water discharged from the waterspouts is equally distributed over the surfaces of the electrodes, the centre lines of the waterspouts and of their associated electrodes are made to coincide.

Incoming water from the heating system passes through distributor 14 (shown in FIGURE 8) to the waterspouts 15, 16, and 17 from which it is discharged at a substantially constant rate with sufficient velocity to pass over the surfaces of the electrodes and to reach the top of the generator.

Distributor 14 is made to divide the flow of circulated water equally among the waterspouts and the flow is maintained at a constant rate by pumps 18 and 19 (shown in FIGURE 8), which circulate the water through the heating system. The rating of pump 19 in gallons per minute must be at least equal to that of pump 18. The water outlet 20 is located below the electrodes, preferably at the bottom of the generator as shown in FIGURE 1. With the construction described in this invention, the incoming water passes at least twice through the heat generating zones inside the neutrals before reaching the outlet.

Perforated metal plate 22, which is located near the top of the generator and has an opening for the passage of each electrode, prevents corrosion of the top of the generator by electric current and also serves to diffuse water reaching the top of the generator so that it becomes more uniform in temperature before making its second passage through the generating zones. This device serves to obtain more uniform temperature of the water surrounding the electrodes, thus preventing phase imbalance due to unequal circuit resistance.

Slots 29 in the neutral electrodes, just under diaphragm plate 21, serve to release permanent gases from the space outside the neutrals. Since water in contact with the neutrals is at the same temperature outside as inside, no water flows through slots 29 by convection.

Cylinder 23 prevents corrosion of the sides of the pressure vessel 1 by electric current. Outlet 24 with float steam trap 25 (shown in FIGURE 8) serves to release permanent gases from the top of the generator. A safety valve 27 (shown in FIGURE 8) is connected with outlet 26.

Figures 5, 6:
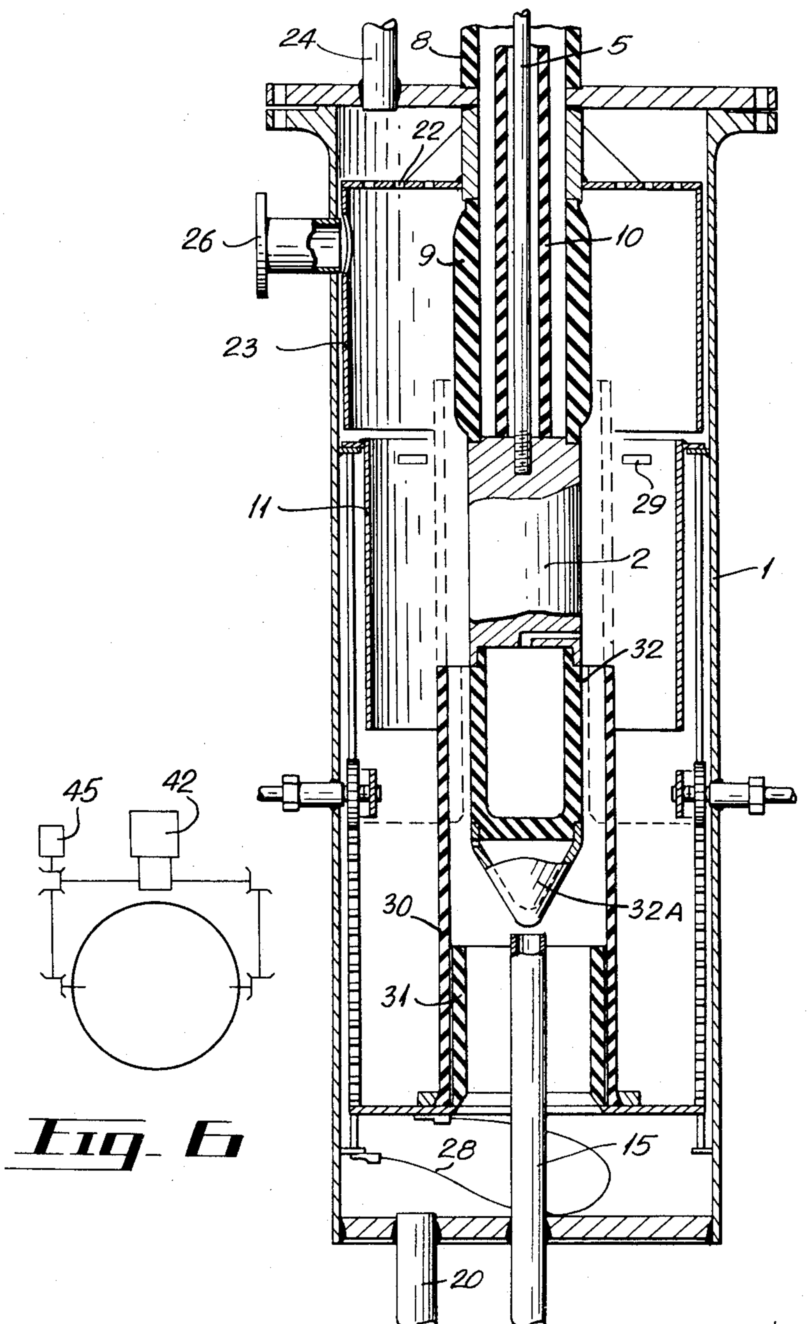
FIGURE 5 is a sectional view of a smaller single-phase hot water generator drawn to a larger scale.
FIGURE 6 shows schematically the control operating mechanism pertaining to the generator in FIGURE 5.

The power load of the generator is controlled by the vertical movement of tubes 30 (one for each electrode), referred to as the control tubes, made of insulating material, which tubes are shown in their lowest operating level in FIGURES 1 and 5, corresponding with full load. Their level at the upper limit of travel, corresponding with minimum load, is indicated by broken lines. The control tubes are concentric with their associated electrodes and are spaced between these associated electrodes and the surrounding neutral electrodes. Insulators 31 and 32 and supporting insulator 9 can conveniently serve to reduce the cross-sectional areas of the conducting paths or bodies of water over a considerable portion of their lengths, when the control tubes are at their upper limit of travel, thus decreasing the minimum permissible load. With the arrangement described in this invention, current taken by each electrode from any direction and at all loads passes through the incoming water which it is the function of the generator to heat to a higher temperature. At light loads, the heat generating zones are confined substantially to the spaces inside the control tubes, through which the incoming water must pass. With the arrangement of insulators and water flow described in this invention, the possibility of generation of steam in the annular spaces surrounding the electrodes at any load is practically eliminated.

The control tube operating mechanism, which is capable of raising and lowering the control tubes vertically, includes supporting frame 33, rack 34 attached to frame 33, guide rods 35 and 36, and optionally a counterweight 37 connected by linkage 38 (preferably a stainless steel ribbon passing over pulleys 39, 40) to the top of rack 34. The pinion 41 (FIGURE 2) is connected with a geared motor mechanism 42 by shaft 43, which passes through a gland 44. A mechanism 45 comprising a geared limit switch, position indicator and a potentiometer for modulating controller action is also connected with geared motor mechanism 42.

The neutrals 11, 12, 13, plates 21, 22, cylinder 23, control tube supporting frames 33, waterspouts 15 and generator shell 1 are all electrically interconnected, thus forming common neutral points in the electric circuit. The generator shell can be metallically grounded to form a grounded neutral or it can be insulated from ground to limit ground current from the generator. If the shell is not grounded by a metallic circuit it must be suitably guarded to prevent accidental contact with it. A flexible conductor 28 serves to connect supporting frame 33 with the shell 1, thus preventing corrosion of contact surfaces in the control tube operating mechanism.

Figure 7:
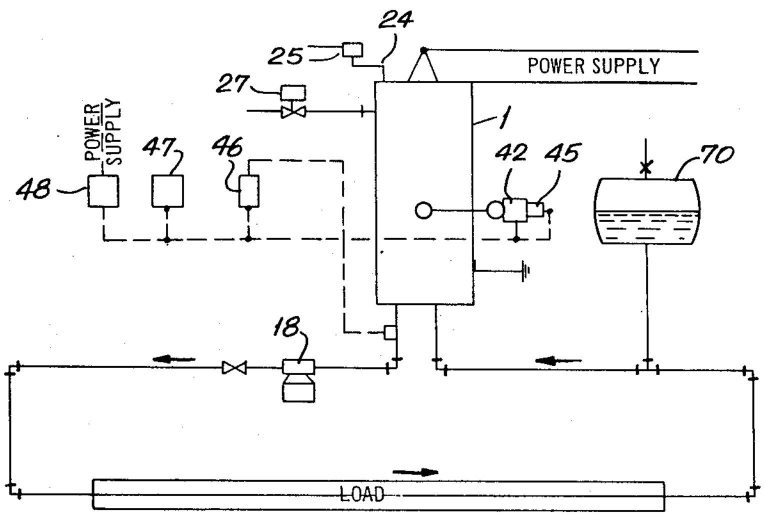
FIGURE 7 shows schematically a closed heating system in which a single-phase electrode hot water generator is used.

Ordinarily, the automatic regulation of the outgoing water temperature would be difficult because of a 2.5 percent adverse temperature coefficient of water resistance, as shown in Equation 2 below, and the time lag between changes in the temperature of the outgoing water caused by variations in the temperature of the incoming water. If the heating load is steady, modulating control equipment as shown in FIGURES 5, 6 and 7 is adequate. Such primary control equipment will position the control tubes in response to variations in the temperature of the outgoing water. Conventional modulating control apparatus is shown schematically in FIGURE 10 in which 46, 47, and 52 are respectively a Honeywell Series 90 Controller, R927C Relay, and Modutrol Motor. The Modutrol Motor, however, must be regarded as the equivalent of motor 42 and mechanism 45 of FIGURES 1, 6, 7, and 8.

Figure 8:
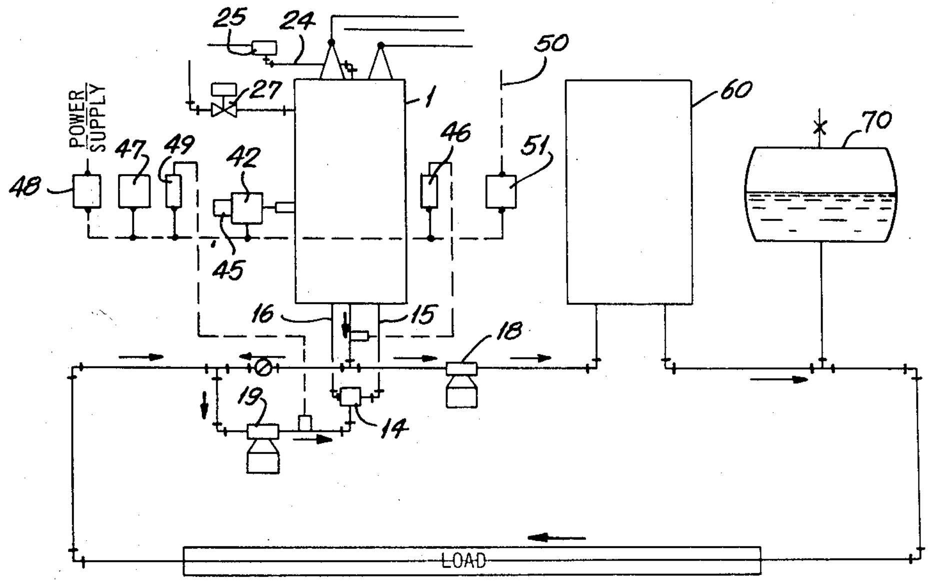
FIGURE 8 shows schematically a closed system in which a 3-phase electrode hot water generator is operated on off-peak power in series with a fuel-fired hot water generator.
Figure 10:
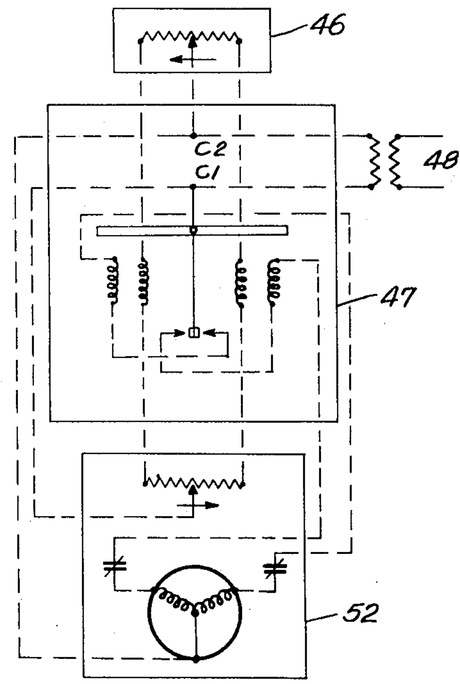
FIGURES 10 and 11 are control circuit diagrams.
Figure 11:
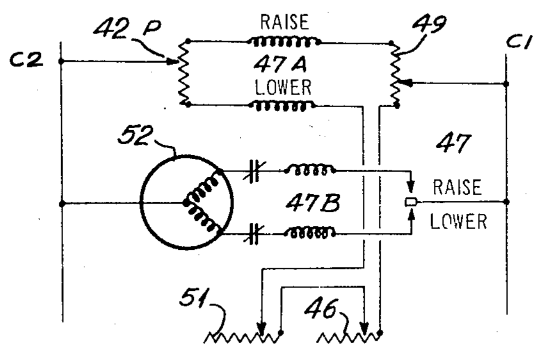

In FIGURE 8, an electrode hot water generator 1 is operated in series with a fuel-fired hot-water generator 60. An expansion tank 70 prevents loss of water from the system caused by changes in volume with changes in temperature of the water. A controller 51, such as a Honeywell electric controller with position-proportioning plus reset action, is connected by leads 50 with a thermal converter (not shown) which measures the power taken by either the generator or the system of which the generator is part, depending on the point at which the power is measured. Controller 51 then functions to prevent either the generator load or the system load exceeding a predetermined limit. When the generator is made to take off-peak power (maintaining a constant system load) the generator load may be quite variable, and unstable control operation will result unless suitable control means is provided. In FIGURES 7, 8, and 10, 48 is a control power supply transformer. In FIGURES 10 and 11, $C_1$ and $C_2$ are terminal connections.

The schematic diagram FIGURE 11 serves to describe modulating controller action (primary control means) whereby a Honeywell Series 90 controller 49, relay 47, and Modutrol motor 52 are made to position the generator control tubes in response to variations in the temperature of the incoming water. A similar controller 46 (secondary control means) measures the outlet water temperature and overrides controller 49 in such a way that if the outlet water temperature rises above a predetermined value, controller action causes the control tubes to be raised and the load to be reduced in proportion to the rise in outgoing water temperature above the predetermined value. Controller 51 (tertiary control means) also overrides controller 49 to raise the control tubes to limit either the generator load or the system load (whichever is measured), if either the generator load or the system load of which the generator load is a part exceeds a predetermined value. The controllers must have suitable modulating ranges. The wiper of the potentiometer in controller 49 moves, in response to changes in the temperature of the incoming water, to a position corresponding with the water temperature and the modulating range. Any change in the wiper position unbalances the current taken by the actuating coils 47A of balance relay 47. Relay contacts then close to energize Modutrol motor 52 which rotates in the direction to raise or lower the control tubes in the direction corresponding with the change in incoming water temperature. As motor 52 rotates, the wiper of potentiometer 42P is moved in the opposite direction to that of the wiper of controller 49, to a position at which the current taken by the relay actuating coils 47A is again balanced. The relay contacts then re-open and the motor stops. Coils 47B in series with the relay contacts are holding coils which function to prevent arcing at the contacts. If the outlet water temperature rises into the modulating range of controller 46, the wiper of potentiometer 46 moves to unbalance the current taken by the actuating coils 47A of relay 47, causing the control tubes to be raised and the load to be decreased in proportion to the rise in the temperature of the outgoing water above normal and the modulating range of controller 46. If the generator load or the system load (depending on which is measured) rises into the modulating range of controller 51, its potentimeter similarly functions to hold the peak load within predetermined limits. Advantages of this controller operation are:

(1) The generator load is instantly adjusted in response to changes in load demand, and (2) The outgoing water temperature is held within the predetermined limit, thus preventing temperature conditions under which flash steam might occur at a high elevation point in the heating system.

MATHEMATICAL RELATIONSHIPS

(*a*) *Electrode Dimensions*

If A is the radius of the cylindrical electrode 2 and B is the radius of the cylindrical neutral 11, concentric with the electrode, the resistance R of the circuit per unit height of water is $$R=\frac{\rho t}{2\pi}\log_e\frac{B}{A}\text{ ohms} \qquad (1)$$

where $\rho t$=the resistivity of the water at its mean temperature $t$.

For a neutral radius and water resistivity of given values, it may be shown mathematically that the concentration of energy at the electrode, where it is greatest, is a minimum when the electrode radius is such that $$\text{Log}_e\frac{B}{A}=1 \text{ or } \frac{B}{A}=e=2.72$$

Figure 9:
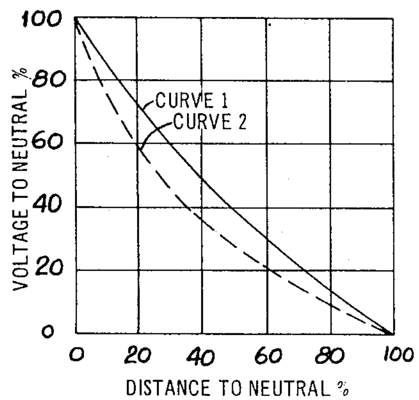
FIGURE 9 is a curve showing voltage gradients and preferred relative dimensions.
Figure 9:
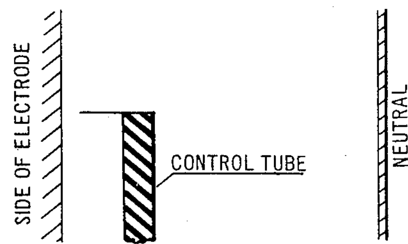

Curve 1 in FIGURE 9 is calculated from Equation 1, assuming a $B/A$ ratio of 2.72/1.

As water passing over the surfaces of the electrodes is ordinarily at a temperature considerably below the mean water temperature, its resistivity is relatively high and the actual voltage gradient is more approximate to that shown in curve 2, FIGURE 9. In order to reduce the energy concentration at the upper edges of the control tubes it is preferable that the control tubes should extend beyond the zones of high voltage gradient. If C is the control tube radius, preferred relative dimensions, as shown in FIGURE 9, are such that dimension C is not less than $A+0.2\ (B-A)$.

For a given water conductivity the concentration of energy at the surface of the electrode (where it is greatest) is directly proportional to the square of the applied voltage. For high voltage hot water generators it is therefore important that provision be made to prevent saturation temperature being reached at points of high energy concentration; otherwise steam will be raised at these points, thus causing an objectionable rise in system pressure and the displacement of water from the system to limit the rise in pressure. The presence of steam at any point of the system would also prevent normal flow of water through the system.

By the passage of the relatively cool incoming water directly over the surfaces of the electrodes, the possibility of saturation temperature being reached at points of high energy concentration is reduced to a minimum. The degree of energy concentration at the electrodes can be limited by making the diameter of the electrodes such that the ratio $B/A=2.72/1$ (plus or minus 5%).

(*b*) *Water Conductivity*

It has been shown experimentally that the conductivity of water rises with its temperature in accordance with the following equation:

$$\gamma_t=\frac{\gamma 25(1+0.045t}{2.125}\text{ micromho-cms.} \qquad (2)$$

where $\gamma t$ is the conductivity of water at temperature $t$° C. when $\gamma_{25}$ is its conductivity at 25° C.

Since the water conductivity varies about 2 to 2.5 percent for every degree C. change in temperature, as compared with its conductivity at 25° C., in order to maintain equal load current per electrode it is necessary to keep water temperatures uniform with respect to electrodes.

(*c*) *Constant Flow and Temperature*

The rate of flow of water depends on the permissible difference in temperature between generator inlet and outlet water temperatures corresponding with a given load. Assuming 3400 B.t.u./kwh., an outlet temperature of $T_1$ ° F. and an inlet temperature of $T_2$ ° F., the water flow required for a load of P kw. is:

$$Q=\frac{P\times 3400}{T_1-T_2}\text{ lbs./hr.} \qquad (3)$$

According to Equation 3, $$P=\frac{Q(T_1-T_2)}{3400}\text{ kw.} \qquad (4)$$

Since the rate of flow of water through the generator (Q lbs./hr.) and the outgoing water temperature ($T_1$) are maintained constant it is apparent from Equation 4 that the generator load P (kw.) is inversely proportional to the incoming water temperature $T_2$. Instant response to load changes caused by variations in the temperature of the water entering the generator can therefore be obtained by positioning the generator control tubes in accordance with the incoming water temperature.

ADVANTAGES

As compared with generators of the prior art, an electrode hot water generator according to this invention has many advantages, including the following:

(1) The flow of water through the generator is directed in such a manner that the possibility of saturation temperature being reached at points of high energy concentration is very remote.

(2) Water temperatures with respect to the electrodes and generating zones are maintained uniform, thus preventing conditions that would cause phase imbalance.

(3) Since the temperature of the water at the top of the generator is considerably below the mean water temperature, if any stream should be generated at points of high energy concentration within the generator, such steam is immediately recondensed on rising above the generating zones.

(4) Critical dimensions are selected to obtain the most advantageous electrical characteristics of the circuits between the electrodes and their associated neutral cylinders.

(5) Since the generator may be operated at any standard distribution voltage, separate power transformers are not required when the heating system is adapted to the use of off-peak power.

(6) The minimum load can be made less than 3% of full load.

(7) Stable automatic control is provided for any loading condition.

(8) The functions of the generator and control are performed with a minimum of apparatus.

MODIFICATIONS

The preferred embodiments of the invention have been described in detail. Modifications may, however, be made. For example:

(1) The control tube operating mechanism may include a wormgear device instead of a rack and pinion or the operating mechanism may be of the hydraulic type.

(2) Although for simplicity one electrode per phase is shown, two or more electrodes per phase can be used.

(3) Six electrodes can be used to accommodate two independent 3-phase sources of power.

(4) When the voltage/kilowatt ratio is relatively low, it is an advantage (*a*) to make the electrodes larger with a $B/A$ ratio of less than 2.72/1, (*b*) to use two electrodes per phase, or (*c*) to apply both (*a*) and (*b*) depending on the actual voltage/kilowatt ratio.

(5) A three-phase generator may be built with three-single-phase units of the construction shown in FIGURE 5.

(6) If the electrode extension 32 is made of insulating material of sufficient hardness to resist the erosive action of the spouted water, tip 32A may be an integral part of it.

(7) In addition to a safety valve 27, other safety devices can be used, such as an alarm system to supervise operating conditions and means for tripping the generator circuit breaker in the event of pump failure, loss of system pressure or an abnormal rise in water temperature.

It will be understood that various modifications in addition to those above mentioned can be made in the specific embodiments disclosed without departing from the spirit of the invention or the scope of the claims.

What is claimed is:

1. An electric hot water generator of the type having at least one electrode and adapted for operation in a closed heating system filled with water which is circulated through the system as a medium of heat transfer, said generator comprising in combination:

(*a*) a heating chamber, (*b*) at least one electrode, having an extension to its lower end made of insulating material, suspended vertically from the upper portion of the heating chamber, (*c*) a waterspout of electrically conductive material directly below each electrode and pointing upwards towards and terminating at substantially the same level as the electrode tip, (*d*) pumping means for circulating water through the heating system and discharging it through the said waterspouts at a substantially constant rate with sufficient velocity to pass over the surfaces of the electrodes, and to reach the top of the heating chamber, (*e*) means for dividing the circulating water equally among the said waterspouts, (*f*) a water outlet located at a level below the electrodes at the bottom of the heating chamber and in a substantially symmetrical position with respect to the centre lines of the electrodes, (*g*) a metal cylinder surrounding each electrode to form a neutral electrode surrounding a heat generating zone, said cylinders being inter-connected and held in place in the vicinity of their tops by means of a diaphragm plate made to provide free water communication between the top and bottom portions of the heating chamber only through the said cylinders, (*h*) a control tube of insulating material for each electrode, said control tubes being concentric with their associated electrodes and spaced between the associated electrode and the surrounding neutral electrode, and having internal dimensions selected so that as the control tube approaches its upper limit of travel, the cross-sectional areas of the conducting bodies of water are reduced over increasing portions of their lengths, and (*i*) means for moving the said control tubes vertically, said means including an external actuating device mechanically connected with an internal mechanism located at a level below the electrodes, made to move the said control tubes upwards to reduce load and downwards to increase load.

2. An electric hot water generator as claimed in claim 1, having a perforated metal plate located near the top of the heating chamber to diffuse the circulating water.

3. An electric hot water generator as claimed in claim 1, having means for releasing permanent gases from the space outside the cylinders forming the neutral electrodes and from the top of the heating chamber.

4. An electric hot water generator as claimed in claim 1, wherein the electrode extensions made of insulating material are provided with tapered metal tips.

5. An electric hot water generator of the type having at least one electrode and adapted for operation in a closed heating system filled with water which is circulated through the system as a medium of heat transfer, said generator comprising in combination:

(*a*) a heating chamber, (*b*) at least one electrode, having an extension to its lower end made of insulating material, suspended vertically from the upper portion of the heating chamber, (*c*) a waterspout directly below each electrode and pointing upwards towards and terminating at substantially the same level as the electrode tip, (*d*) pumping means for circulating water through the heating system and discharging it through the said waterspouts at a substantially constant rate with sufficient velocity to pass over the surfaces of the electrodes and to reach the top of the heating chamber, (*e*) means for dividing the circulating water equally among the said waterspouts, (*f*) a water outlet located at the bottom of the heating chamber, (*g*) a metal cylinder surrounding each electrode to form a neutral electrode, said cylinders being interconnected and held in place in the vicinity of their tops by means of a diaphragm plate made to provide free water communication between the top and bottom zones of the heating chamber only through the said cylinders, (*h*) a control tube of insulating material for each electrode, said control tubes being concentric with their associated electrodes and spaced between the associated electrode and the surrounding neutral electrode, (*i*) means for moving the said control tubes vertically, (*j*) primary control means for positioning the said control tubes in response to variations in the temperature of the incoming water, and (*k*) secondary control means for overriding the primary control means to raise the said control tubes if the outgoing water temperature rises above a predetermined value.

6. An electric hot water generator of the type having at least one electrode and adapted for operation in a closed system filled with water which is circulated through the system as a medium of heat transfer, said generator comprising in combination:

(*a*) a heating chamber, (*b*) at least one electrode having an extension to its lower end made of insulating material, and suspended vertically from the top of the heating chamber, (*c*) a waterspout directly below each electrode and pointing upwards towards and terminating at substantially the same level as the electrode tip, (*d*) pumping means for circulating water through the heating system and discharging it through the said waterspouts at a substantially constant rate with sufficient velocity to pass over the surfaces of the electrodes and to reach the top of the heating chamber, (*e*) means for dividing the circulating water equally among the said waterspouts, (*f*) a water outlet located at the bottom of the heating chamber, (*g*) a metal cylinder surrounding each electrode to form a grounded neutral electrode, said cylinders being interconnected and held in place in the vicinity of their tops by means of a diaphragm plate made to provide free water communication between the top and bottom zones of the heating chamber only through the said cylinders, (*h*) a control tube of insulating material for each electrode, said control tubes being concentric with their associated electrodes and spaced between the associated electrode and the surrounding neutral electrode, (*i*) means for moving the said control tubes vertically, (*j*) primary control means for positioning the said control tubes in response to variations in the temperature of the incoming water, (*k*) secondary control means for overriding the primary control means to raise the said control tubes if the outgoing water temperature rises above a predetermined value, and (*l*) tertiary control means overriding the primary control means to raise the control tubes if one of (i) the generator load and (ii) the system load of which the generator load in part exceeds a predetermined value.

7. In an electric hot water generator through which water is circulated, said generator being adapted for operation in a closed heating system filled with water which is circulated through the heating system, said generator comprising:

(*a*) a heating chamber having at least one electrode suspended vertically from the upper portion of the heating chamber, said chamber containing heat generating zones surrounding said electrodes, (*b*) a waterspout mounted in the heating chamber directly below each electrode, and pointing upwards towards the tip of its associated electrode, (*c*) pumping means for circulating water through the heating chamber at a constant rate, (*d*) means for directing the water returned from the heating system to the intake of said pumping means, (*e*) distributing means for dividing the circulating water equally among the waterspouts, and (*f*) a water outlet at the bottom of the heating chamber equidistant from the vertical centre lines of the electrodes, the improvement which comprises:

(1) means for directing the water discharged from the pumping means successively through said distributing means, through the waterspouts towards the tips of the electrodes and over the surfaces of the electrodes to the top of the heating chamber, and (2) a diaphragm plate mounted in the heating chamber which supports cylindrical neutral electrodes, one for each electrode, and provides free water passages between upper and lower portions of the heating chamber only through the spaces between the electrodes and their associated neutral electrodes, whereby the water is directed back through the heat-generating zones to the outlet in the bottom of the heating chamber.

8. In an electrical hot water generator through which water is circulated, said generator being adapted for operation in a closed heating system filled with water which is circulated through the heating system, said generator comprising:

(*a*) a heating chamber having at least one electrode suspended vertically from the upper portion of the heating chamber, said chamber containing heat generating zones surrounding said electrodes, (*b*) a waterspout mounted in the heating chamber directly below each electrode, and pointing upwards towards the tip of its associated electrode, (*c*) pumping means for circulating water through the heating chamber at a constant rate, (*d*) means for directing the water returned from the heating system to the intake of said pumping means, (*e*) distributing means for dividing the circulating water equally among the waterspouts, (*f*) a perforated metal plate located near the top of the heating chamber to diffuse the circulating water, and (*g*) a water outlet at the bottom of the heating chamber equidistant from the vertical centre lines of the electrodes, the improvement which comprises:

(1) means for directing the water discharged from the pumping means successively through said distributing means, through the waterspouts towards the tips of the electrodes, over the surfaces of the electrodes and through the perforated plate to the top of the heating chamber, and (2) a diaphragm plate mounted in the heating chamber which supports cylindrical neutral electrodes, one for each electrode, and provides free water passages between upper and lower portions of the heating chamber only through the spaces between the electrodes and their associated neutral electrodes, whereby the water is directed back through the heat-generating zones to the outlet in the bottom of the heating chamber.

9. An electric hot water generator of the type having at least one electrode and adapted for operation in a closed heating system filled with water which is circulated through the system as a medium of heat transfer, said generator comprising in combination:

(*a*) a heating chamber, (*b*) at least one electrode, having an extension to its lower end made of insulating material, suspended vertically from the upper portion of the heating chamber, (*c*) a waterspout directly below each electrode and pointing upwards towards the terminating at substantially the same level as the electrode tip, (*d*) pumping means for circulating water through the heating system and discharging it through the said waterspouts at a substantially constant rate with sufficient velocity to pass over the surfaces of the electrodes, (*e*) means for dividing the circualting water equally among the said waterspouts, (*f*) a water outlet located at a level below the electrodes of the heating chamber, (*g*) a metal cylinder surrounding each electrode to form a neutral electrode, said cylinders being interconnected and held in place in the vicinity of their tops by means of a diaphragm plate made to provide free water communication between the top and bottom portions of the heating chamber only through the said cylinders, (*h*) a control tube of insulating material for each electrode, said control tubes being concentric with their associated electrodes and spaced between the associated electrode and the surrounding neutral electrode, (*i*) means for moving the control tubes vertically, and (*j*) a perforated metal plate near the top of the generator to diffuse the circulating water.

10. An electric hot water generator of the type having at least one electrode and adapted for operation in a closed heating system filled with water which is circulated through the system as a medium of heat transfer, said generator comprising in combination:

(*a*) a heating chamber, (*b*) at least one electrode, having an extension to its lower end made of insulating material, suspended vertically from the upper portion of the heating chamber, (*c*) a waterspout directly below each eletcrode and pointing upwards towards and terminating at substantially the same level as the electrode tip, (*d*) pumping means for circulating water through the heating system and discharging it through the said waterspouts at a substantially constant rate with sufficient velocity to pass over the surfaces of the electrodes, (*e*) means for dividing the circulating water equally among the said waterspouts, (*f*) a water outlet located at a level below the electrodes of the heating chamber, (*g*) a metal cylinder surrounding each electrode to form a neutral electrode, said cylinders being interconnected and held in place in the vicinity of their tops by means of a diaphragm plate made to provide free water communication between the top and bottom portions of the heating chamber only through the said cylinders, (*h*) a control tube of insulating material for each electrode, said control tubes being concentric with their associated electrodes and spaced between the associated electrode and the surrounding neutral electrode, (*i*) means for moving the control tubes vertically and, (*j*) means for releasing permanent gases from the space outside the cylinders forming the neutral electrodes and from the top of the generator.

References Cited in the file of this patent

UNITED STATES PATENTS

| | | |
|---|---|---|
| 2,451,296 | Mittendorf | Oct. 12, 1948 |
| 2,611,852 | Eaton | Sept. 23, 1952 |

FOREIGN PATENTS

| | | |
|---|---|---|
| 383,196 | Great Britain | Nov. 10, 1932 |
| 423,332 | Great Britain | Jan. 30, 1935 |
| 52,668 | France | June 12, 1944 |
| | (French addition to 893,172) | |
| 863,145 | Great Britain | Mar. 15, 1961 |